(12) United States Patent
Sischo

(10) Patent No.: US 11,657,700 B2
(45) Date of Patent: May 23, 2023

(54) SYSTEM AND METHOD FOR MONITORING REFUSE CONTAINERS AND REPORTING SERVICE COLLECTIONS

(71) Applicant: Nickolas Sischo, Macon, GA (US)

(72) Inventor: Nickolas Sischo, Macon, GA (US)

(73) Assignee: Antilles Management, LLC

( * ) Notice: Subject to any disclaimer, the term of this patent is extended or adjusted under 35 U.S.C. 154(b) by 0 days.

(21) Appl. No.: 17/482,128

(22) Filed: Sep. 22, 2021

(65) Prior Publication Data
US 2022/0092966 A1 Mar. 24, 2022

Related U.S. Application Data

(60) Provisional application No. 63/082,362, filed on Sep. 23, 2020.

(51) Int. Cl.
*G08B 25/00* (2006.01)
*G08B 25/10* (2006.01)
*G01C 9/02* (2006.01)
*G01P 13/00* (2006.01)

(52) U.S. Cl.
CPC ............... *G08B 25/10* (2013.01); *G01C 9/02* (2013.01); *G01P 13/00* (2013.01)

(58) Field of Classification Search
CPC .. G08B 25/10; G01C 9/02; G01C 9/00; G01P 13/00
See application file for complete search history.

(56) References Cited

U.S. PATENT DOCUMENTS

| | | | | |
|---|---|---|---|---|
| 11,001,352 B1* | 5/2021 | Nassim | ................ | E02B 15/104 |
| 2013/0087562 A1* | 4/2013 | Thukral | ................ | B65F 1/1615 |
| | | | | 220/210 |
| 2014/0208813 A1* | 7/2014 | Reeb | ..................... | B65F 1/1646 |
| | | | | 70/277 |
| 2019/0279169 A1* | 9/2019 | Ivanovic | .......... | G06Q 10/06316 |
| 2020/0204995 A1* | 6/2020 | Salomon | ............ | G07C 9/00896 |

* cited by examiner

*Primary Examiner* — Ojiako K Nwugo
(74) *Attorney, Agent, or Firm* — Jason T. Daniel, Esq.; Daniel Law Offices, P.A.

(57) ABSTRACT

A system for monitoring refuse containers includes a refuse container sensing device having a main body that defines an interior space, a pair of elongated magnets that are countersunk longitudinally along the length of the main body, a movement sensor that is positioned within the interior space of the main body, and a wireless communication unit. The system also includes a site owner server that is in wireless communication with the sensing device, and a container monitoring application for execution on a user interface device. Each of the site owner server and the user interface device are in selective communication with each other and the wireless communication unit of the sensing device to receive alarm notifications generated in response to detected movement by the movement sensor.

12 Claims, 3 Drawing Sheets

SYSTEM AND METHOD FOR MONITORING REFUSE CONTAINERS AND REPORTING SERVICE COLLECTIONS

CROSS-REFERENCE TO RELATED APPLICATIONS

This application claims the benefit of U.S. application Ser. No. 63/082,362 filed on Sep. 23, 2020, the contents of which are incorporated herein by reference.

TECHNICAL FIELD

The present invention relates generally to the refuse industry, and more particularly to a system and method for monitoring and reporting refuse container collection activities.

BACKGROUND

The statements in this section merely provide background information related to the present disclosure and may not constitute prior art.

In the waste management industry, it is common for commercial customers such as retailers, restaurants, and manufacturers, for example, to have multiple refuse containers/dumpsters. Indeed, many commercial customers have multiple locations, and each location may be serviced by a different refuse disposal company.

Although customer's contract to have their container(s) emptied on specific days/times and/or a certain number of times per week, it is difficult for the customer to confirm whether or not their services are being performed on time and on schedule. Indeed, because some disposal companies miss scheduled pickups, it is not uncommon for a customer to be billed for services that were never performed. Moreover, this situation sometimes results in the customer paying additional charges for subsequent "overloaded fees" that would not be necessary if the services were actually performed.

Accordingly, it would be beneficial to provide a system and method for monitoring services and tracking collections and capacity, that can provide end users with an independent verification of service performance so as to overcome the drawbacks described above and to permit the auditable accountability of haulers charges in each invoice.

SUMMARY OF THE INVENTION

The present invention is directed to a system for monitoring refuse containers. One embodiment of the present invention can include a refuse container sensing device having a main body that defines an interior space, a pair of elongated magnets that are countersunk longitudinally along the length of the main body, a movement sensor that is positioned within the interior space of the main body, and a wireless communication unit.

In one embodiment, the system can further include a site owner interface that is in wireless communication with the sensing device, and a container monitoring application for execution on a user interface device. Each of the site owner's interface device and the user interface device can be in selective communication with the wireless communication unit, and can receive alarm notifications generated in response to detected movement by the movement sensor.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
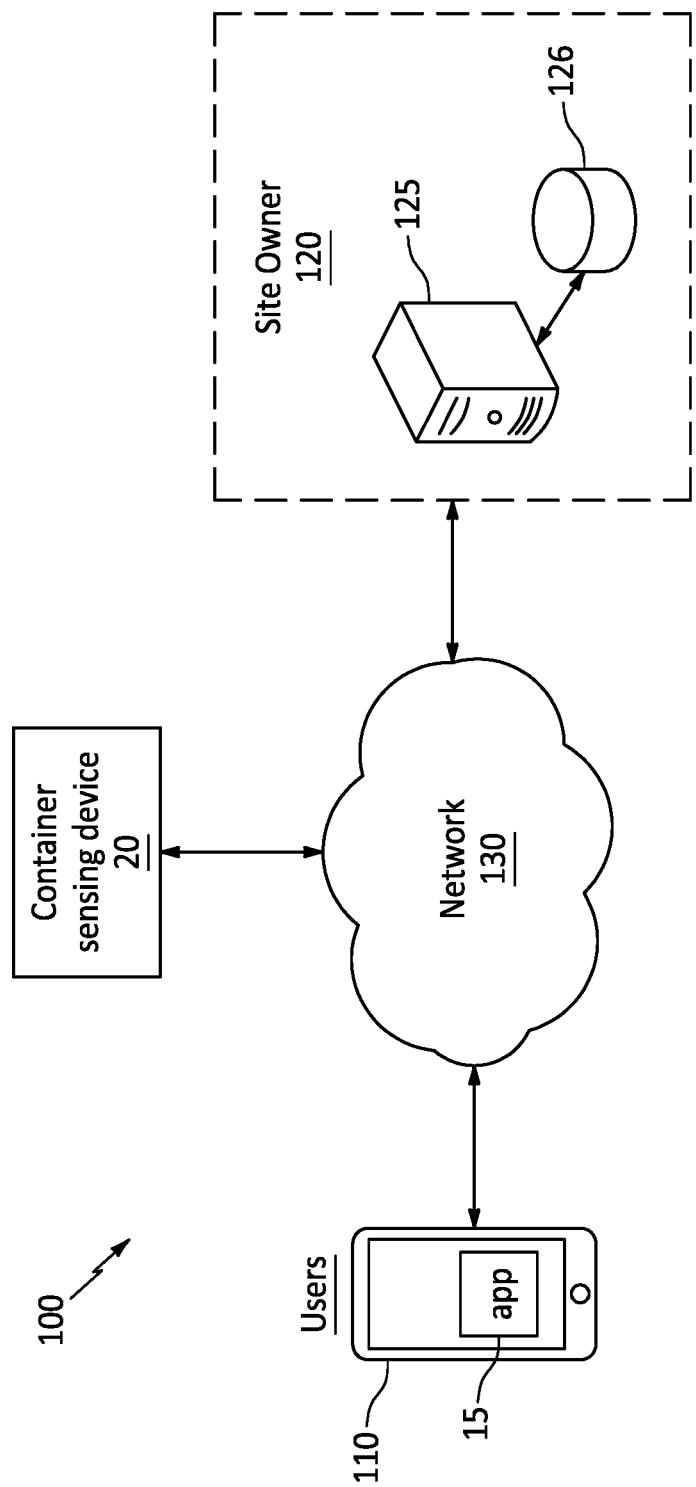
FIG. 1 is an exemplary operating environment of one embodiment of the container monitoring system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, the term "removably secured," and derivatives thereof shall be used to describe a situation wherein two or more objects are joined together in a non-permanent manner so as to allow the same objects to be repeatedly joined and separated.

As described herein, the term "connector" includes any number of different elements that work alone or together to repeatedly join two items together in a nonpermanent manner. Several nonlimiting examples include opposing strips of hook and loop material (i.e., Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

As described herein, the term "system administrator" can be used to describe any individual, group or legal entity that is performing the below described system administration 120, in furtherance of the methodology described herein. In one embodiment, the system administrator can be a third-party company providing the below described methodology to the end user customer.

As described herein, an "end user" and "customer" can be used interchangeably to describe any individual, group or legal entity that receives container information from the system administrator.

As described herein, "container information" shall include any data and other type of information that is captured by or derived from the below described container sensor device. More specifically, this information can include, but is not limited to information determining times when refuse has been added to the container, when the container has been emptied, when the container has been tilted, when the container has been moved, and the current location and movement status of the container. Of course, any number of other types of information can also be communicated by the sensor devices as described below.

FIG. 1 is a schematic illustration of an exemplary operating environment 100 for utilizing the refuse container monitoring and reporting system. In one embodiment, the operating environment 100 can include a refuse container sensor device 20 that can be in selective communication with a customer interface device 110, and a system administration device 120 over a network 130.

The network 130 can be any type of network, including a cellular network, a local area network ("LAN"), such as an intranet, a wide area network ("WAN"), the internet, and/or any other type of data transmission and reception medium, for example.

The interface device 110 can be any type of computing device that is operable by a human user. A computing device refers to any device with a processor and memory that can execute instructions and communicate with another device. Computing devices include, but are not limited to, computers, smartphones, tablet computers, smartwatches, laptop computers and/or purpose-built machines that are encoded with an application interface, so as to perform the functionality so described. In either instance, a computing device will include one or more client applications, such as a web browser, and/or an application interface, for example, which can allow the device to communicate with other interface devices and/or the system administration 120.

In one embodiment, the system can include a programming code for implementing the system functionality on a smartphone in the form of a mobile application (i.e., App) 15 which can be downloaded and installed onto the user device. As described herein, the mobile application 15 (i.e., refuse container monitoring application) can be any set of programmatic instructions that can be loaded onto any type of processor enabled device and can include program language for execution on the device that enables a user of the device to interact with the individual devices 20 and/or the system administration 130, in order to receive container information and/or send operating instructions thereto.

The system administration 120, according to one embodiment, can include one or more individual computing devices 125 that can be connected to one or more databases 126 in which various portions of the below described methodology can be performed. In one embodiment, the system administration 120 can function to provide a central hub for controlling the communication with the interface device 110 through any number of different mediums such as a website, a mobile application, or a direct connect audiovisual service such as cellular data, for example. In this regard, one or more of the individual computing devices 125 can include various web servers, email servers, application database servers and so forth.

The database 126 can function to store any type of data, including the system operating instructions for facilitating communication between the device components, routing information and/or generating presentation screens for implementing the below described methodology. To this end, the database can include any type of computer-readable storage mediums, including all forms of volatile and non-volatile memory.

In various embodiments, data captured by the container sensor device 20 can be stored on the database 126 and/or may be provided directly to the interface device 110 for storage or viewing thereon.

Figure 2:
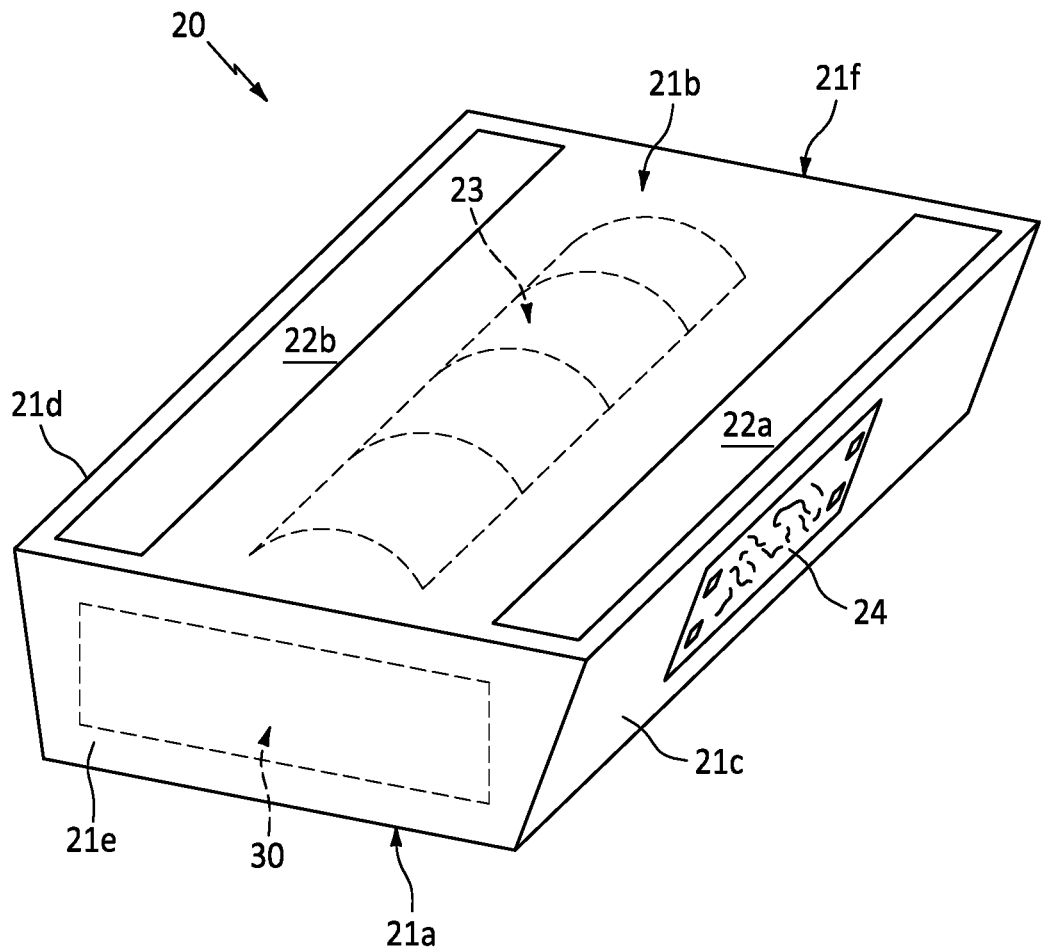
FIG. 2 is a perspective view of the container sensing device, in accordance with one embodiment of the invention.

FIG. 2 illustrates one embodiment of a container sensor device 20. In the illustrated embodiment, the main body can include a generally trapezoidal-shaped member having a top surface 21a, a flared bottom surface 21b, and a plurality of side surfaces 21c, 21d, 21e and 21f that form a watertight inside space for receiving and storing the device components. As described herein, the main body can be constructed from any number of different materials that are, for example, relatively strong and stiff for their weight. Several nonlimiting examples include but are not limited to various lightweight metals or metal alloys (e.g., aluminum, or alloys thereof), or plastic/polymers (e.g., high-density polyethylene (HDPE), rigid polyvinyl chloride (PVC), or polyethylene terephthalate (PET)), for example. Of course, any number of other shapes, sizes and construction materials are also contemplated.

In the preferred embodiment, a pair of elongated magnets 22a and 22b can be disposed longitudinally along the bottom end of the main body 21b. As shown, each of the magnets can preferably be countersunk within the bottom end of the wall 21b and located adjacent to the outer walls 21c and 21d, so as to provide the most possible purchase to increase friction with a container to which the device is secured.

In the preferred embodiment, the magnets can comprise of neodymium magnets having a magnetic pull force of at least 20 pounds (i.e., requiring at least 20 pounds of pulling force to be removed from the container), such a feature allowing an end user to position the device onto the metallic surface of a refuse container at any number of desirable locations without requiring tools or hardware.

Of course, the inventive concepts are not limited to the use of two magnets at the illustrated orientation, as any number of other connectors can be disposed along the main body at any number of other orientations and can function to connect the device to a refuse container in either a removable or permanent manner. For example, other embodiments are contemplated wherein the main body includes apertures for receiving mounting hardware such as screws or bolts, for example.

In one embodiment, a battery bank 23 having any number of individual batteries can be positioned within the main body and can function to provide the necessary power requirements to each of the device components. In the preferred embodiment, the battery bank can be permanently located within the main body and can be designed to last for continuous operation for 48 months, which can be the determined useful life of the device. Of course, other embodiments are contemplated wherein the batteries can be rechargeable in nature via a charging port such as a mini or micro-USB port, for example. Of course, traditional batteries can also be utilized, and the main body can further include a battery compartment having a removable cover (not illustrated) for allowing a user to access the same.

In either instance, the battery bank can preferably be positioned adjacent to the bottom end 21b of the main body as a location between the pair of elongated magnets 22a and 22b. Placement of the battery bank in this location advantageously lowers the center of gravity of the device to the bottom end in order to aid the magnets or other connectors in gripping onto the container.

In one embodiment, a matrix barcode 24 such as a QR code, or other such device can be positioned along the outside of the main body. In the preferred embodiment, the device 20 will comprise a solid-state device having no moving parts or selectable buttons, therefore, the QR code can direct the user of an interface device 110 to download the mobile application 15 onto their device in order to selectively activate the device 20. Upon activation, the below described control unit will communicate container information with the user's established account.

The control unit 30 can be positioned within the main body so as to be in electrical communication with the battery bank. The control unit can include any number of different sensors for detecting movement of the container to which the device is secured and can further include functionality for transmitting the detected movement to one or both of the user interface device 110 and the system administrator interface device 120 over the network.

In one embodiment, the control unit 30, can include a processor 31 that is conventionally connected to an internal memory 32, a communication unit 33, a location module 34, a vibration sensor 35, and a tilt sensor 36. Although illustrated as separate elements, those of skill in the art will recognize that one or more system components may comprise, or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processing unit 31 can be a conventional central processing unit (CPU) or any other type of device, or multiple devices, capable of manipulating or processing information such as program code stored in the memory 32 and for causing the circuitry to complete the activities and functionality described herein. In the preferred embodiment, a timer module can be provided as a function of the processing unit so as to allow the device to accurately measure the passage of time. The inclusion of the timer module permits the device to send automatic updates without receiving a query or upon detection of movement by the below sensor.

Figure 3:
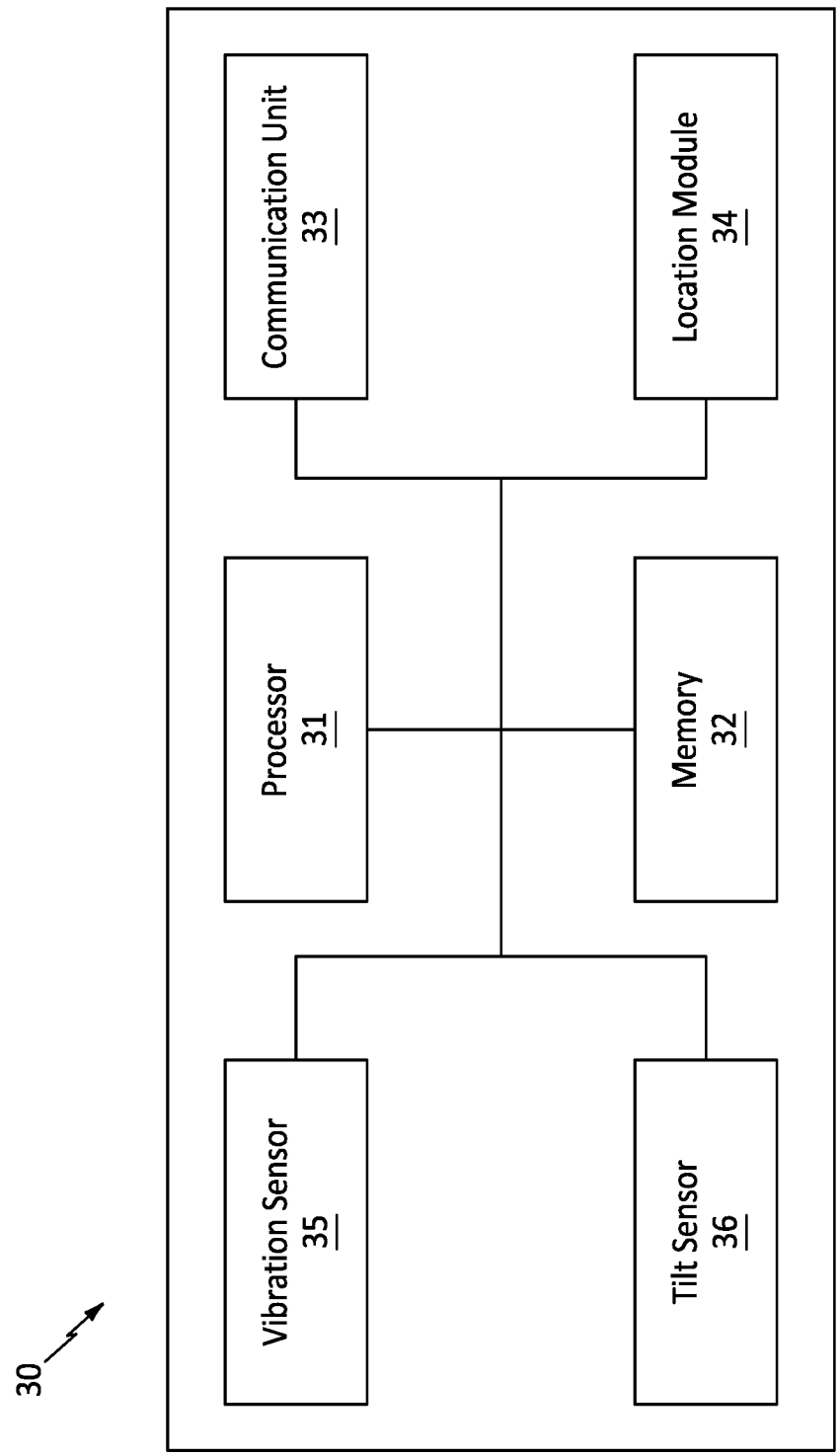
FIG. 3 is a simplified block diagram of the internal controller of the container sensing device, in accordance with one embodiment of the invention.

Memory 32 can act to store operating instructions in the form of program code for the processor 31 to execute. Although illustrated in FIG. 3 as a single component, memory 32 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a digital hard drive, for example, containing programs that permit the processor to perform the functionality described below. Additionally, memory 32 can also include one or more cache memories that provide temporary storage of at least some program code in order to reduce the number of times program code must be retrieved from the bulk storage device during execution. Each of these devices are well known in the art.

The communication unit 33 can include any number of components capable of sending and/or receiving electronic signals with an externally located device, either directly or over a network. In one preferred embodiment, the communication unit can include a cellular transceiver for communicating wirelessly over a cellular network. However, any number of other known transmission and reception mechanisms and protocols can also be utilized herein, several nonlimiting examples include the use of a radio transceiver, a Bluetooth transceiver and/or a network adapter for communicating over a WAN, LAN or the internet via an internet service provider, for example.

In one embodiment, the device can include a location module 34 that can utilize the cellular transceiver 33 of the communication unit to interact with the mapping and location services offered by the cellular provider. Such systems are well known in the art and allow the location of the device to be identified and sent to one or both of the user interface device 110 or the system administrator 120 upon request or periodically.

In one embodiment, a vibration sensor 35 can function to detect vibrations of the device and container to which it is secured. This movement can function to allow the device to detect when refuse is deposited within the container, so as to allow the end user to know when it is most often utilized.

In one embodiment, a tilt sensor 36 can function to detect rotation of the device and the container to which it is secured. In the preferred embodiment, the tilt sensor can be configured to report a tilt alarm to the processor when the sensor detects rotation of the device in excess of 90 degrees. In this regard, the tilt sensor can function to allow the device to detect when the container is being lifted and emptied into a garbage truck so as to confirm the collection company is performing the contracted service and to provide a detailed accounting of when the container has been emptied.

As described herein, the movement sensor and the tilt sensor can each include any number of components suitable for detecting physical motion and triggering a signal in response thereto. Several nonlimiting examples include mercury switches, non-mercury movement switches and/or an accelerometer that is implemented within the device such that when the sensor detects any movement of the device (i.e., in any plane or rotation), a signal can be generated and sent to the processor.

In operation, a user can obtain a device 20 from the system administrator or a reseller, and can secure the device onto a refuse container at their location. To maintain uniformity, the device will preferably be positioned beneath the right sleeve of the container. Next, the user can scan the code 24 along the outside of the device using their smartphone or other user interface device 110. Upon scanning the code, the user will be directed to a website generated by the site owner 120 where they can undergo a registration procedure. Upon completion of the registration procedure, the device 20 will be linked to the user account.

During the registration process, and once the device 20 is secured onto the container, the processor can query the tilt sensor to determine the current angle of the device. This angle can be logged internally as the zero angle, so that rotation of the device at or in excess of 90 degrees from the zero angle will be reported as the container being emptied. Such a feature can account for instances where the end user positions the device at other locations along the container and/or does not position the device at a horizontal angle as instructed.

Although outside the scope of this document, the registration process may include options for allowing the user to upload information about the collection company who is responsible for servicing the container, along with pricing information for the same. This information, along with portions of the below described reports may be optionally available to other system users in order to allow the site owner to provide a comparison of service company pricing and performance data.

In either instance, once the device is linked to the user account, the device can function to send reporting information pertaining to movement detected by the system sensors. In this regard, movement detected only by the vibration sensor can pertain to instances where trash is being loaded into the container. Conversely, movement detected by both the vibration sensor and the tilt sensor can be identified as the container being emptied by the service provider. With this information, the user can be able to track the activity of the container and if/when the same is emptied. Additionally, the location module can optionally function to provide real time location information about the container, thus ensuring the container is not moved or swapped out with a smaller unit.

Although described above with regard to a single device 20, this is for illustrative purposes only. To this end, the system can be configured to allow a single user to obtain, install and track an unlimited number of devices 20 each secured to a different refuse container for which the user has a service contract for. Such a feature allows the system 100 to track the usage and collection activities of multiple refuse containers in different areas having any number of different service collection companies.

As described herein, one or more elements of the refuse container sensor device 20 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for monitoring refuse containers, said system comprising:
    a refuse container sensing device having a main body that defines an interior space;
    a connector that is secured along the main body of the device, said connector including functionality for securing the device onto a refuse container;
    a movement sensor that is positioned within the interior space of the device, said movement sensor including a tilt sensor that is configured to detect a rotation of the sensing device in excess of 90 degrees; and
    a communication unit that is configured to communicate wirelessly with an external device.

2. The system of claim 1, further comprising:
    a site owner system that is configured to send and receive information with the communication unit.

3. The system of claim 2, further comprising:
    a refuse container monitoring application having programmatic instructions for execution on a user interface device,
    said refuse container monitoring application including functionality for instructing the user interface device to selectively communicate with at least one of the site owner system or the sensing device.

4. The system of claim 3, wherein the sensing device includes functionality for generating an alarm condition in response to a detected movement by the movement sensor;
    wherein the sensing device includes functionality for sending the generated alarm to the site owner system, and
    wherein the site owner system includes functionality for generating an alarm log and for sending the alarm log to the user interface device.

5. The system of claim 1, wherein the movement sensor includes a vibration sensor that is configured to detect a vibration of the container to which the sensing device is secured.

6. The system of claim 1, wherein the connector includes a pair of magnets.

7. The system of claim 6, wherein the pair of magnets are positioned along a bottom wall of the sensing device.

8. The system of claim 7, wherein the pair of magnets are countersunk into the bottom wall of the sensing device and are positioned adjacent to a pair of sidewalls of the sensing device.

9. The system of claim 8, further comprising:
    a battery bank that is positioned along the bottom wall of the sensing device, wherein the battery bank is in electrical communication with each of the movement sensor and the communication unit.

10. The system of claim 1, wherein the communication unit comprises a cellular transceiver.

11. A system for monitoring refuse containers, said system comprising:
- a refuse container sensing device having a main body that defines an interior space;
- a connector that is secured along the main body of the device, said connector including functionality for securing the device onto a refuse container;
- a movement sensor that is positioned within the interior space of the device; and
- a communication unit that is configured to communicate wirelessly with an external device,
- wherein the connector includes a pair of magnets.

12. A system for monitoring refuse containers, said system comprising:
- a refuse container sensing device having a main body that defines an interior space;
- a connector that is secured along the main body of the device, said connector including functionality for securing the device onto a refuse container;
- a movement sensor that is positioned within the interior space of the device;
- a communication unit that is configured to communicate wirelessly with an external device;
- a site owner system that is configured to send and receive information with the communication unit; and
- a refuse container monitoring application having programmatic instructions for execution on a user interface device said refuse container monitoring application including functionality for instructing the user interface device to selectively communicate with at least one of the site owner system or the sensing device.

* * * * *